Patented May 30, 1939

2,160,574

UNITED STATES PATENT OFFICE 2,160,574

MANUFACTURE OF CARBON TETRACHLORIDE

Bruno Hennig, Bitterfeld, Germany, assignor to I. G. Farbenindustrie Aktiengesellschaft, Frankfort-on-the-Main, Germany No Drawing. Application April 26, 1938, Serial No. 204,463. In Germany May 10, 1937

4 Claims. (Cl. 260—658)

The present invention relates to a process for manufacturing carbon tetrachloride.

Known processes for the manufacture of carbon tetrachloride are based on the use of methane or derivatives of methane, especially carbon bisulfide. These parent materials are not particularly easily obtained. This invention solves the problem of producing carbon tetrachloride by starting from chlorine and easily accessible hydrocarbon compounds other than those of the methane series. All saturated and unsaturated aliphatic hydrocarbons and their products of chlorination come into question and the precise problem is to find the working conditions under which dis-union of the carbon atoms can be achieved.

An indication that this dis-union is possible is to be found in a thesis published by Nicodemus (Jour. für praktische Chemie (2) 83, page 316), who observed that by passage of tetrachlorethane or tetrachlorethylene over pumice 700° C., there is produced a mixture of chlorination products. In the case of these two materials, however, only small proportions (each about 5-10 per cent.) of carbon tetrachloride and chloroform occur as chlorination products of methane; from this it appeared hopeless to obtain carbon tetrachloride in industrial yield from dicarbon compounds.

It was found that by varying this process of decomposition in the sense that saturated or unsaturated aliphatic hydrocarbons and their chlorination products are decomposed in the presence of chlorine in considerable excess, surprisingly favorable yields of carbon tetrachloride are obtained. Furthermore, that the best yields of carbon tetrachloride are produced by the scission of dicarbon compounds, for example acetylene, ethylene, ethane and their chlorination products. In the case of these compounds it is possible to limit the by-products to the also valuable compounds perchlorethylene and hexachlorethane, while in the case of aliphatic hydrocarbons having more than 2 carbon atoms the formation of aromatic by-products of little value, for example hexachlorobenzene, increases with the increasing number of carbon atoms and decomposition with separation of carbon occurs. The process is more easily conducted when unsaturated hydrocarbons and their chlorination products are used than when saturated hydrocarbons are used, because in the case of the latter, in view of the large quantities of hydrogen chloride which are formed in the decomposition, the concentration of the hydrocarbon is strongly diluted, which leads to a poor utilization of the reaction space.

The commercial value of the process is best when starting from acetylene, it being a matter of indifference whether the intermediate products formed before the scission of the carbon compound, for instance, dichlorethylene, tetrachlorethane, trichlorethylene, pentachlorethane, perchlorethylene and hexachlorethane are previously isolated or whether all reactions occur in a single operation.

To facilitate the reaction, any body presenting a large surface and, if desired, impregnated with a metal salt, may be used. Especially suitable is active carbon. The scission begins, for example in the case of active charcoal and an excess of 25 per cent. of chlorine, at about 400° C. The most favorable temperature is between 600° and 650° C. At temperatures above 700° C. the dicarbon compounds begin to decompose with separation of carbon and formation of hexachlorobenzene.

The following examples illustrate the invention:

*Example 1.*—15 grams of acetylene per hour are mixed with 280 grams of chlorine per hour in a tube in sand in known manner and are caused to react in an underlying layer of iron turnings or active carbon. The chlorinated dicarbon hydrocarbons thus produced are simultaneously heated in the same tube or in a continuation tube of for example 1.4 liters reaction space which is filled with active carbon at 600 to 650° C., whereby the carbon atom is split and chlorination to carbon tetrachloride occurs. The subsequently condensed crude product consists of about 71 per cent. of carbon tetrachloride, 10 per cent. of perchlorethylene and 19 per cent. of hexachlorethane.

*Example 2.*—80 grams of tetrachlorethane per hour are heated together with 120 grams of chlorine per hour at 600 to 650° C. in a tube charged with 1.4 liters of active carbon. The mixture of gases leaving the furnace is condensed in known maner and fractionally distilled. Its composition is 83 per cent. of carbon tetrachloride, 5 per cent. of perchlorethylene and 12 per cent. of hexachlorethane. The total yield of valuable chlorination products (carbon tetrachloride, perchlorethylene and hexachlorethane) amounts to 91 per cent. of the tetrachlorethane used.

If instead of a hydrocarbon or instead of tetrachlorethane there is used as starting material any aliphatic chlorinated hydrocarbon having 2 carbon atoms, for instance, dichlorethylene, trichlorethylene, perchlorethylene, ethylene chloride, hexachlorethane, and others, or any desired mixture of these chlorinated hydrocarbons or even hydrocarbons themselves, practically the same results are obtained under the same conditions.

*Example 3.*—25 grams of propane per hour are mixed in sand with 500 grams of chlorine per hour and the mixture is caused to react in a tube of 1.4 liters capacity charged with active carbon and heated to 600 to 650° C. The product consists of 68 percent. of carbon tetrachloride, 12 per cent. of perchlorethylene, 15 per cent. of hexachlorethane and 5 per cent. of hexachlorobenzene.

It is obvious that my invention is not limited to the foregoing examples or to the specific details given therein. Thus, for instance, as a body presenting a large surface there may be used pumice stone, silica gel, alumina. As additional agents catalyzing the reaction there may be used metal halides, such as zinc, zinc chloride, aluminum chloride, or iron chloride, active carbon acting itself as a catalyst which, however, may be further improved by the co-use of a metal halide. It is even possible to dispense with a catalytic agent; in this case, however, a higher temperature is necessitated to perform scission of the hydrocarbon or chlorinated hydrocarbon and addition of chlorine.

What I claim is:

1. The process for manufacturing carbon tetrachloride which comprises reacting an aliphatic compound of the group consisting of saturated and unsaturated hydrocarbons containing 2 to 3 carbon atoms and the chlorination products thereof with chlorine at a temperature above 400° C. to about 700° C. in the presence of a body presenting a large surface, the chlorine being in excess to the extent of 20 to 40 percent. above the proportion theoretically necessary for producing carbon tetrachloride.

2. The process for manufacturing carbon tetrachloride which comprises reacting an unsaturated aliphatic hydrocarbon containing 2 to 3 carbon atoms with chlorine at a temperature between 600 to 650° C. in the presence of a body presenting a large surface, the chlorine being in excess to the extent of 20 to 40 per cent. above the proportion theoretically necessary for producing carbon tetrachloride.

3. The process for manufacturing carbon tetrachloride which comprises reacting an unsaturated chlorinated aliphatic hydrocarbon containing 2 to 3 carbon atoms with chlorine at a temperature between 600° to 650° C. in the presence of a body presenting a large surface, the chlorine being in excess to the extent of 20 to 40 per cent. above the proportion theoretically necessary for producing carbon tetrachloride.

4. The process for manufacturing carbon tetrachloride which comprises reacting acetylene with chlorine at a temperature between 600° to 650° C. in the presence of active carbon, the chlorine being in excess to the extent of 20 to 40 per cent. above the proportion theoretically necessary for producing carbon tetrachloride.

BRUNO HENNIG.